June 7, 1938. R. WINSHIP 2,120,049
FASTENING MEANS FOR WALLBOARD AND THE LIKE
Filed Dec. 15, 1937
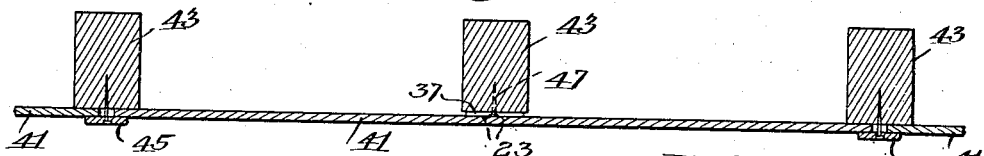
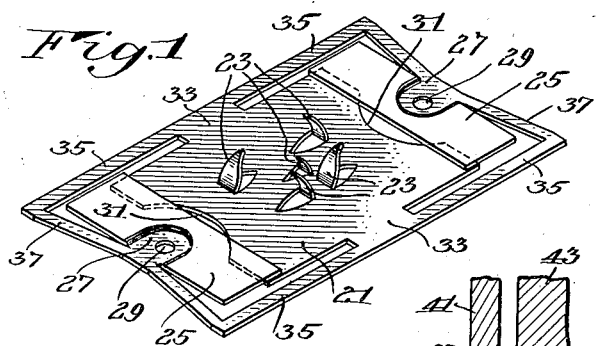
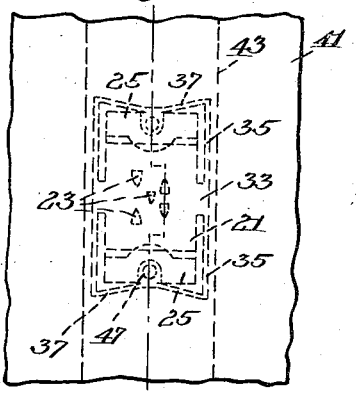
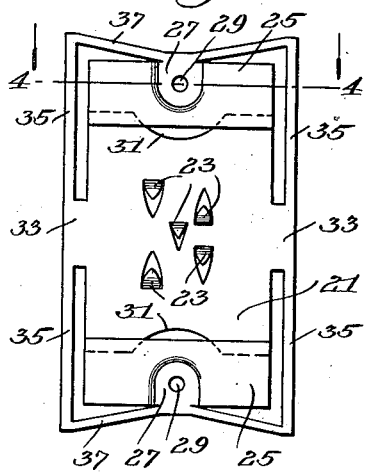
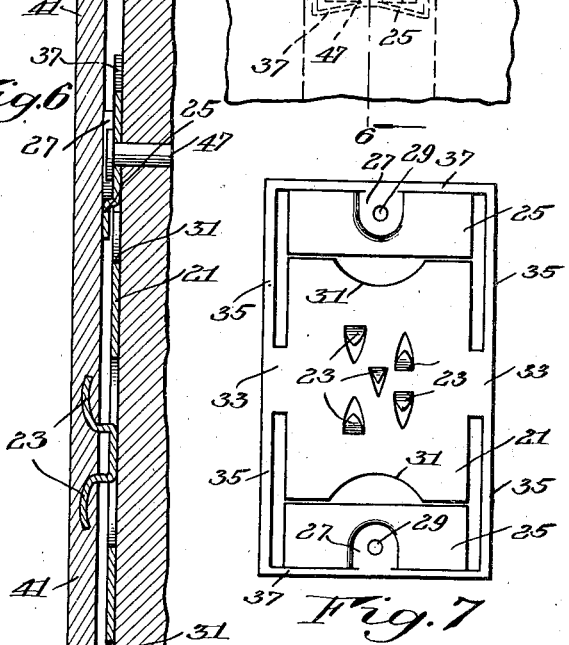
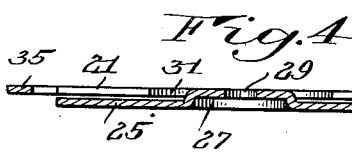
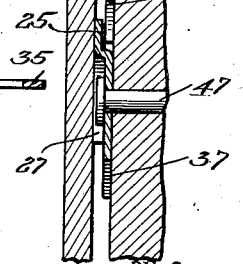
INVENTOR.
Ross Winship
BY Cumpston & Shepard
his ATTORNEYS Patented June 7, 1938

2,120,049

UNITED STATES PATENT OFFICE 2,120,049

FASTENING MEANS FOR WALLBOARD AND THE LIKE

Ross Winship, Lockport, N. Y., assignor to The Upson Company, Lockport, N. Y., a corporation of New York Application December 15, 1937, Serial No. 179,968

5 Claims. (Cl. 20—92)

This invention deals with fasteners for securing wallboard or the like to a suitable support, particularly at points spaced inwardly from the marginal edges of the wallboard.

An object of the invention is to provide a generally improved and more satisfactory wallboard fastening device which overcomes the objections and undesirable features of prior art constructions.

Another object is the provision of a fastening device which can be applied in any desired position of orientation, without reference to the direction of the grain of the wallboard which is to be fastened thereby, and which is capable of taking care of expansion or contraction of the wallboard to a reasonable extent in any direction.

Still another object is the provision of a fastening device in which not more than two layers of sheet metal are interposed between the wallboard and the support, so that the wallboard is not unduly spaced from the support.

A further object is the provision of a fastening device in which the parts are normally and initially held in proper relationship to each other, with the movable part substantially at the center of its available range of movement, so that when the wallboard is fastened to the fastening device, it will be capable of its full intended range of movement in all intended directions.

A still further object is the provision of a fastening device in which resilient means is employed for connecting the parts, so that after displacement from its initial undisplaced position, the resilient means will exert a force tending to shift the movable portion back to its original undisplaced position, thus assisting the wallboard in returning to its initial shape or dimensions after it has been deformed therefrom by expansion or contraction.

A still further object is the provision of a fastening device made entirely from a single piece of sheet metal or other suitable stock, so that there are no separate or loose parts likely to become disengaged from each other, and so that the trouble and expense of manufacture are reduced to a minimum.

To these and other ends the invention resides in certain improvements and combinations of parts, all as will be hereinafter more fully described, the novel features being pointed out in the claims at the end of the specification.

In the drawing:

Fig. 1 is a perspective view of a fastening device constituting a preferred illustrative example of the present invention;

Fig. 2 is a cross section through a wall and supporting studs showing the manner of use of the present device;

Fig. 3 is a face view of the fastening device in its completed form;

Fig. 4 is a section substantially on the line 4—4 of Fig. 3;

Fig. 5 is a face view of a fragment of wallboard fastened to a support by the fastening device;

Fig. 6 is a vertical section substantially on the line 6—6 of Fig. 5, and

Fig. 7 is a face view of the blank from which the fastening device is made, at an intermediate stage of its manufacture.

The same reference numerals throughout the several views indicate the same parts.

Referring now to the drawing, the fastening device forming a preferred example of the present invention is made from a single piece of sheet metal suitably cut, bent, and formed to provide a central plate portion 21 of substantial area, having a plurality of upstanding prongs 23 projecting therefrom, on which prongs the wallboard is adapted to be impaled in known manner. The prongs may be of any suitable size and shape, as well understood in the art. Preferably two prongs curve toward each other, and two other prongs curve away from each other, as shown, so that when the wallboard is impaled forcibly on the prongs, the prongs will dig into the wallboard and the two prongs curved toward each other will clinch over in a direction toward each other, while the two prongs curved away from each other will clinch or bend over in a direction away from each other, thus firmly locking the wallboard to the prongs and preventing disengagement therefrom except by the exertion of a substantial degree of force.

Made from the same piece of sheet metal, are two securing portions 25 at opposite marginal edges of the central plate portion 21, these securing portions preferably being deformed upwardly out of the plane of the plate 21 and then being moved toward each other so that they overlie opposite edges of the plate 21, as readily seen in Figs. 1, 3, and 6. Near the centers of the securing portions 25 are portions 27 which remain in the original plane of the plate 21 and which, therefore, seem to be depressed with respect to the elevated portions 25 after these latter portions have been pressed upwardly in the manufacturing process. These portions 27 are provided with nailing holes 29 through which nails or other suitable fastening means may be driven into any desired support.

The securing portions 25, in overlapping relation to the plate portion 21, hold the plate portion 21 against movement in a direction away from the support to which the device is attached, without interfering with free movement of the plate 21 in any direction in its own plane, through a limited range of movement. In order to increase its available range of movement, the ends of the plate 21 may be scalloped as at 31 to increase the spacing between this plate and the depressed portions 27 which lie in the same plane as the plate 21.

The plate 21 is connected to both of the securing portions 25 by bendable means preferably of a resilient or spring-like nature. This connecting means may be formed by arms connected to the plate 21 about midway of the sides of the plate which extend from one securing portion 25 to the other securing portion 25, as indicated at 33, the arms extending thence from the connections 33 alongside and spaced from the edges of the plate 21, as at 35, to a point beyond the remote edges of the portions 25, and thence turning and extending as at 37 to connect with the portions 27. The arms 35, 37 are made sufficiently narrow so that they are readily bendable, while the desired resilience or spring action in these arms is secured by making the entire fastener from a sheet metal plate having a sufficient degree of springiness or resilience.

Fig. 7 shows a face view of the article after the necessary cuts have been made in the sheet metal blank and after the prongs 23 have been bent up and the portions 25 have been deformed upwardly, but before the portions 25 have been brought toward each other. From the position shown in Fig. 7, the portions 25 and 27 at each end of the device are forced toward the center of the device, to the position shown in Fig. 3, wherein the portions 25 overlap the margins of the central plate 21 and thus retain this plate against movement out of its own plane. This inward forcing of the portions 25 and 27 toward the center of the plate 21 bends the arms 37 to the positions indicated in Fig. 3.

In use, devices of this kind are secured to the support to which the wallboard is to be fastened at suitable points spaced inwardly from the marginal edges of the wallboard. For instance, as indicated in Fig. 2, it may be desired to secure a wallboard panel 41 to studding 43, arranged at such intervals that the wallboard panels each extend from one stud to the second stud therefrom. Where the panels meet each other, it is customary to use battens 45 to cover the joint between adjacent panels and to give a paneled effect to the ceiling or walls on which the wallboard is used. Over the intermediate stud, however, it is usually desired not to employ a batten or strip, nor is it desired to nail the wallboard to this intermediate stud through the face of the board, for the nail heads would then be visible. Consequently, fastening means of the present kind is employed to secure the wallboard in a blind or invisible manner to this intermediate stud. One or more of the present fastening devices may be secured to the intermediate stud 43 as by means of nails 47 (Figs. 2 and 6) driven through the holes 29, and then the wallboard panel is placed against the fastening device and driven firmly on to the prongs 23 either by means of a sharp blow or heavy pressure applied to the wallboard directly over the prongs, which then enter the wallboard stock (usually but not necessarily of fiberboard) and bend over in this stock as shown in Fig. 6 so that the prongs do not penetrate through the wallboard and do not become visible on the face thereof.

As moisture conditions change, the wallboard will tend to expand or contract between different points where it is fastened to the support. Such expansion or contraction is admirably taken care of by the present fastening device, for the plate 21 which is fixed to the wallboard can move in any direction parallel to the plane of the wallboard, with respect to the parts 25 and 27 which are fixed by the nails to the support. The range of movement of the plate 21 is made sufficiently great to take care of all expansion or contraction likely to occur in wallboard panels of normal size, even under great differences in moisture conditions.

It is noted that each of the arms connecting the plate 21 to the securing portions 25 has two portions 35 and 37 at a substantial angle to each other. Thus, no matter in which direction the plate 21 may tend to move in its own plane, one of the connecting portions 35 or 37 will be at a substantial angle to the direction of movement and will constitute a lever arm which may be readily bent in the necessary manner by the expansion and contraction forces. Also, since the portions 35 and 37 are somewhat resilient or springy, they will constantly tend to move the displaced plate 21 back to its initial central or undisplaced position, thus assisting the wallboard in moving back to its normal position without buckling or undue straining, when moisture conditions revert to normal. The thickness of material interposed between the wallboard 41 and the support is only two thicknesses of sheet metal, as seen from Fig. 6, so that the whole device, in use, is relatively thin and does not space the wallboard unduly from the support. The entire device being of one piece, it is easy and inexpensive to manufacture and there are no loose parts likely to become disengaged from other parts as is the case from some other prior constructions. Also, the central plate 21 is of fairly large dimensions, so that the force of a blow on the wallboard over the prongs 23 is spread by the plate over a substantial area of the support to which the device is applied. This is especially important where it is desired to apply wallboard over an old plaster wall for if the area of the prong plate be relatively small the necessary blow on the wallboard may be transmitted to such a concentrated area of the plaster surface that the plaster will be badly fractured and broken up, so that it does not act as a proper firm support for the wallboard fastening device. This danger is overcome by the present construction.

Since the securing portions 25 overlie the plate 21 across the full width of the plate, cocking or bending of the plate out of its proper plane is obviated and the plate is held securely in its proper plane at all times. The arms 35 and 37 which fasten the plate 21 to the securing portions 25, 27, insure that the prong plate will be properly centered with respect to the parts 25 and 27 when it is initially applied to the wall, and thus after the wallboard is impaled on the prongs, the full range of movement in either direction will be available, which is a great advantage over some prior constructions wherein the part on which the wallboard is impaled may accidentally be placed near one end or the other of its range of movement when the wallboard is applied thereto, thus greatly reducing the available range of movement after application.

Another advantage of the present construction, when used over an old plaster wall, is that the force of the hammer blow used in driving the nails 47 through the holes 29 is not concentrated in a small area around the nail head, when the nail has been driven home, which might cause shattering of the plaster at this point, but is spread over a substantial area so that damage to the plaster is avoided. The thickness of the nail head is usually slightly less than the depth of the cup-shaped depression around the nail holes 29, so that when the nail is driven home, the last blow of the hammer will fall upon the elevated portion 25 of the device, rather than upon the small area depressed portion 27. The force of the blow falling upon the portion 25 will be transmitted only partly to the depressed portion 27, and another part of the force of the blow will be transmitted to the edge of the plate 21 underlying the portion 25. Thus the force of the hammer blow will be dissipated over a sufficient area so that it is not likely to crack or shatter the plaster, when the present fastening devices are used over an old plaster wall or ceiling.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A fastener for wallboard and the like, including a plate portion having a rear surface for bearing engagement with a support, said plate portion also having a prong projecting forwardly therefrom to be imbedded in wallboard or the like placed against the front surface of said plate portion, a second portion also having bearing engagement with said support and adapted to be fixed to said support, and a bendable arm connecting said plate portion to said second portion.

2. A fastener for wallboard and the like, including a plate portion having a prong to be imbedded in wallboard or the like, a second portion for attachment to a support, said plate portion having a limited range of movement with respect to said second portion in all directions substantially parallel to the general plane of said wallboard, bendable means connecting said plate portion to said second portion and initially holding said plate portion approximately centered with respect to its said range of movement, said bendable means being capable of bending when expansion and contraction forces in said wallboard tend to move the portion of said wallboard adjacent said plate portion of said fastener in a direction substantially parallel to the general plane of said wallboard, so that said plate portion may move with respect to said second portion to permit such movement of said wallboard to take place, and means holding said plate portion against displacement in a direction transverse to said general plane.

3. A fastener for wallboard and the like, including a plate portion having a prong to be imbedded in wallboard or the like, two securing portions for attachment to a support, both of said securing portions partially overlying said plate portion along opposite edges thereof to retain said plate portion against displacement in a direction away from said support while allowing movement of said plate portion through a limited range with respect to said securing portions in a direction substantially parallel to said wallboard, and bendable arm means connecting said plate portion to both of said securing portions.

4. A fastener for wallboard and the like, including a plate portion having a prong to be imbedded in wallboard or the like, two securing portions for attachment to a support, both of said securing portions partially overlying said plate portion along opposite edges thereof to retain said plate portion against displacement in a direction away from said support while allowing movement of said plate portion through a limited range with respect to said securing portions in a direction substantially parallel to said wallboard, and resilient spring means connecting said plate portion to both of said securing portions, said spring means tending to restore said plate portion to its initial undisplaced position when it is displaced therefrom.

5. A fastener for wallboard and the like, made from a single piece of sheet metal cut, stamped, and formed to provide a central plate portion of substantial area having a plurality of upstanding prongs projecting from the front face thereof so that wallboard or the like may be impaled on said prongs, securing portions for attachment to a support at each of two opposite edges of said plate portion, each of said securing portions overlying said plate portion to retain it against movement in a direction away from said support while permitting movement of said plate portion through a limited range with respect to said securing portions in all directions substantially parallel to the plane of wallboard impaled on said prongs, and arms connecting said plate portion to both of said securing portions, each of said arms having two relatively narrow and readily bendable portions at a substantial angle to each other.

ROSS WINSHIP.